J. O. ALMEN.
CALCULATING MACHINE.
APPLICATION FILED APR. 13, 1912.

1,060,878.

Patented May 6, 1913.
9 SHEETS—SHEET 1.

WITNESSES:
Hans Hansen.
N. W. Dalquest

INVENTOR
John Otto Almen
BY
L. L. Westfall
ATTORNEY

J. O. ALMEN.
CALCULATING MACHINE.
APPLICATION FILED APR. 13, 1912.

1,060,878.

Patented May 6, 1913.
9 SHEETS—SHEET 3.

WITNESSES:
Hans Hansen.
N. W. Dalquist.

INVENTOR
John Otto Almen
BY
L. L. Westfall
ATTORNEY

J. O. ALMEN.
CALCULATING MACHINE.
APPLICATION FILED APR. 13, 1912.

1,060,878.

Patented May 6, 1913.
9 SHEETS—SHEET 5.

WITNESSES:
Hans Hansen
N. W. Dalquest

INVENTOR
John Otto Almen.
BY
L. L. Westfall
ATTORNEY

J. O. ALMEN.
CALCULATING MACHINE.
APPLICATION FILED APR. 13, 1912.
1,060,878.
Patented May 6, 1913.
9 SHEETS—SHEET 6.
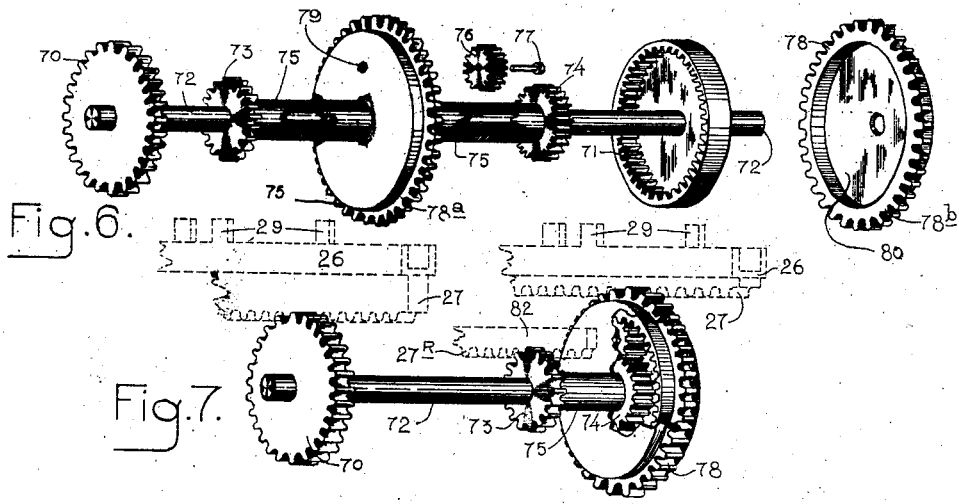
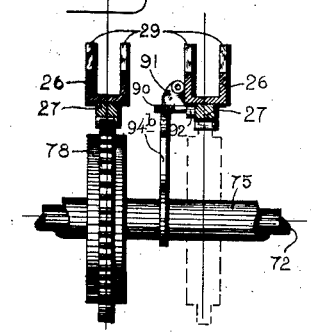
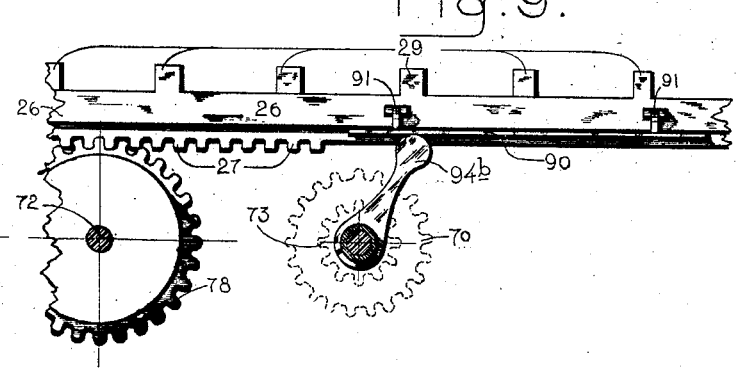
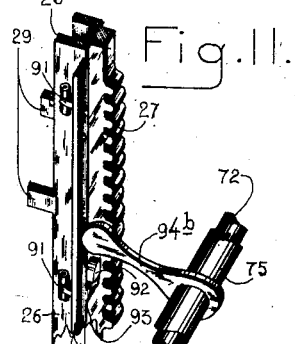
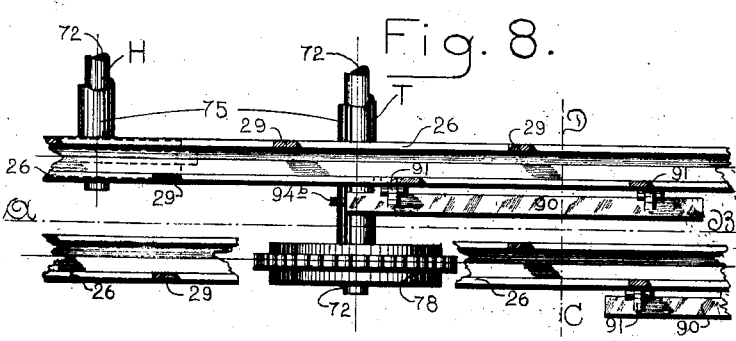
WITNESSES:
Hans Hansen
N. W. Dalquist
INVENTOR
John Otto Almen
BY
L. L. Westfall
ATTORNEY

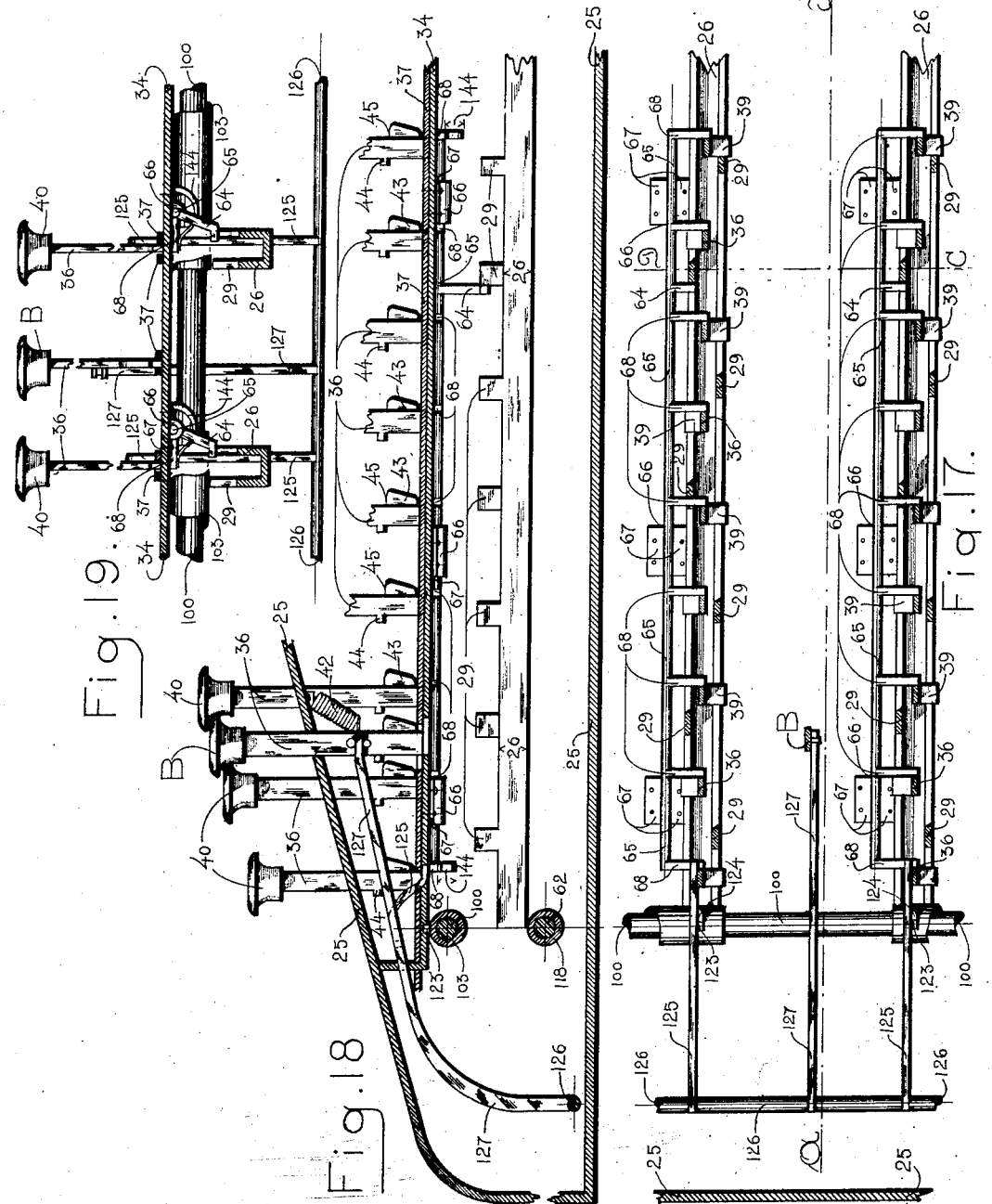

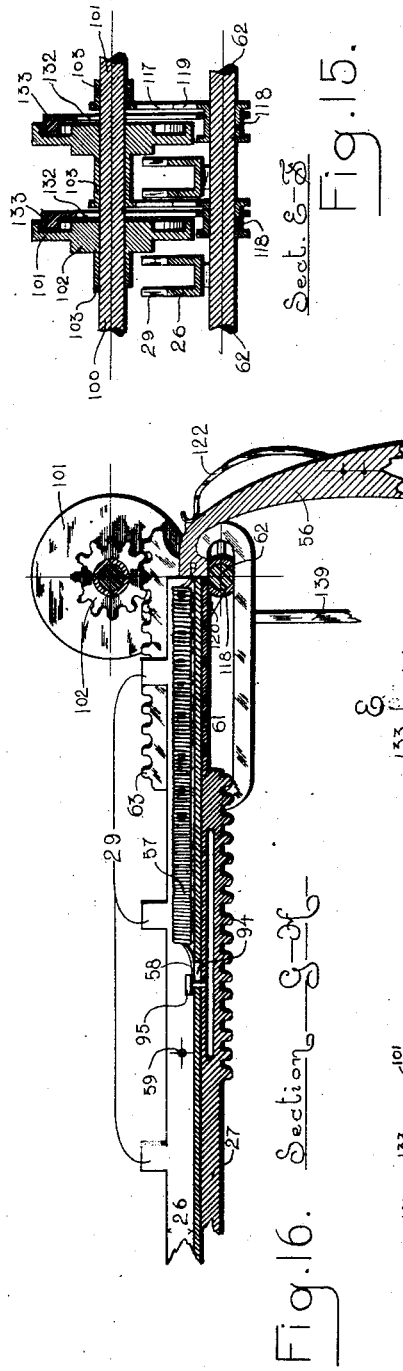
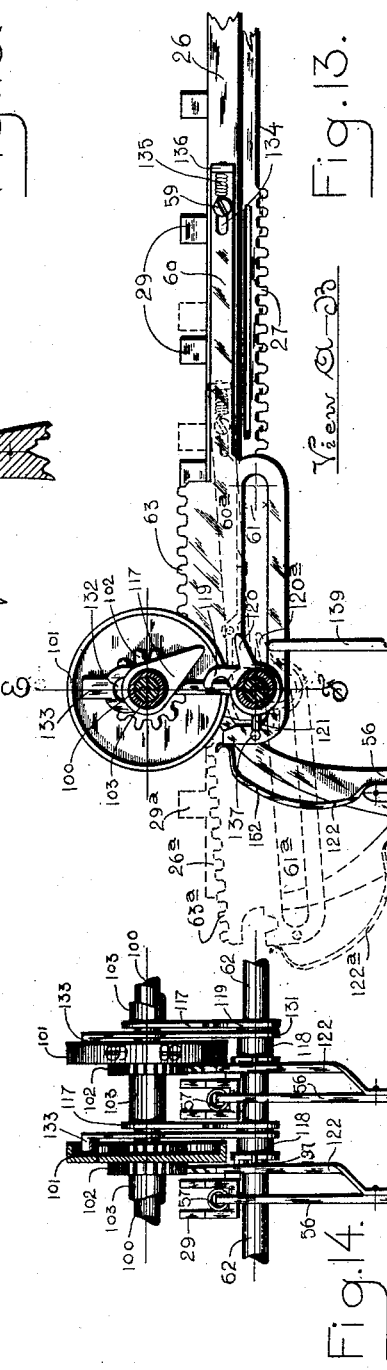
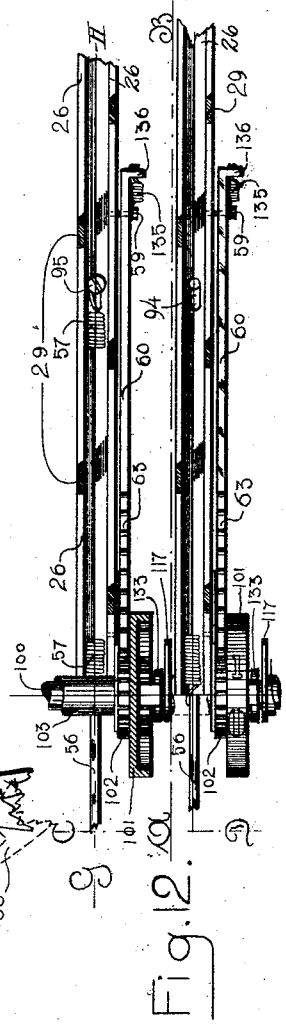

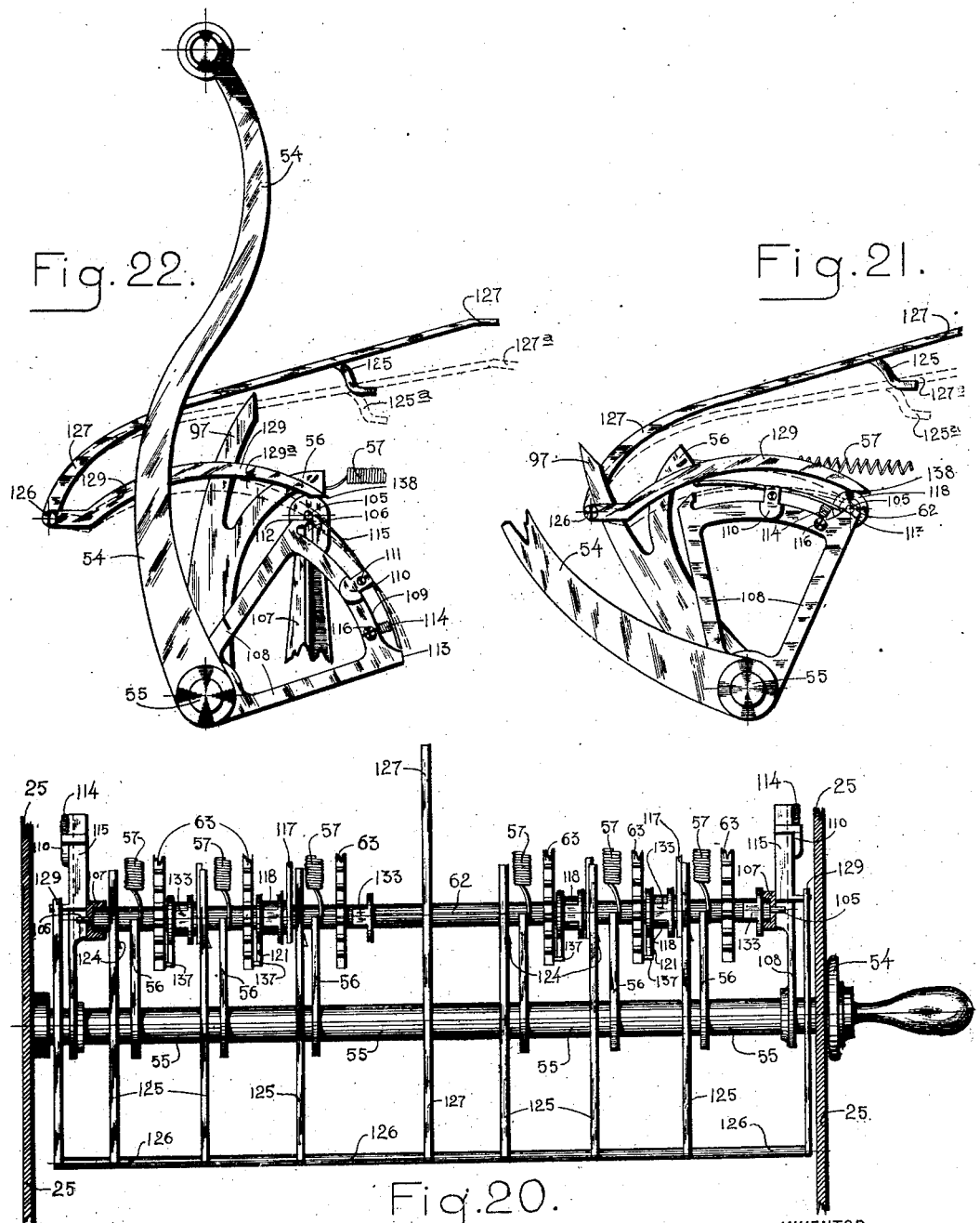

UNITED STATES PATENT OFFICE.

JOHN OTTO ALMEN, OF SPOKANE, WASHINGTON, ASSIGNOR TO CONTINENTAL COMPUTING CASH-REGISTER COMPANY, OF SPOKANE, WASHINGTON, A CORPORATION.

CALCULATING-MACHINE.

1,060,878. Specification of Letters Patent. Patented May 6, 1913.

Application filed April 13, 1912. Serial No. 690,581.

*To all whom it may concern:*

Be it known that I, JOHN OTTO ALMEN, citizen of the United States of America, residing at Spokane, in the county of Spokane and State of Washington, have invented certain new and useful Improvements in Calculating-Machines, of which the following is a specification.

This invention pertains to calculating machines and has for its object to provide a sure, simple and accurate device for computing problems in addition and subtraction and furnishing the results thereof in figures.

With these and other objects in mind the invention comprises the novel features of construction and combinations of parts more fully hereinafter described.

Broadly speaking the invention consists of a plurality of pairs of bars (one pair for each decimal in the minuend of the problem to be solved), the bars of each pair representing the minuend and subtrahend respectively, and means for adjusting the bars to change the relative positions of the numerals on the mechanism coöperating with the bars, to cause the same to indicate the minuend, subtrahend and remainder of a given problem in subtraction. Either the minuend or subtrahend side may be utilized to total a column of figures in addition.

A special feature of the invention is the utilizing of a system of gears so arranged and operated as to economically and accurately differentiate as to direct the movements of the bars and other mechanism as to give the mathematical results desired.

Figure 1:
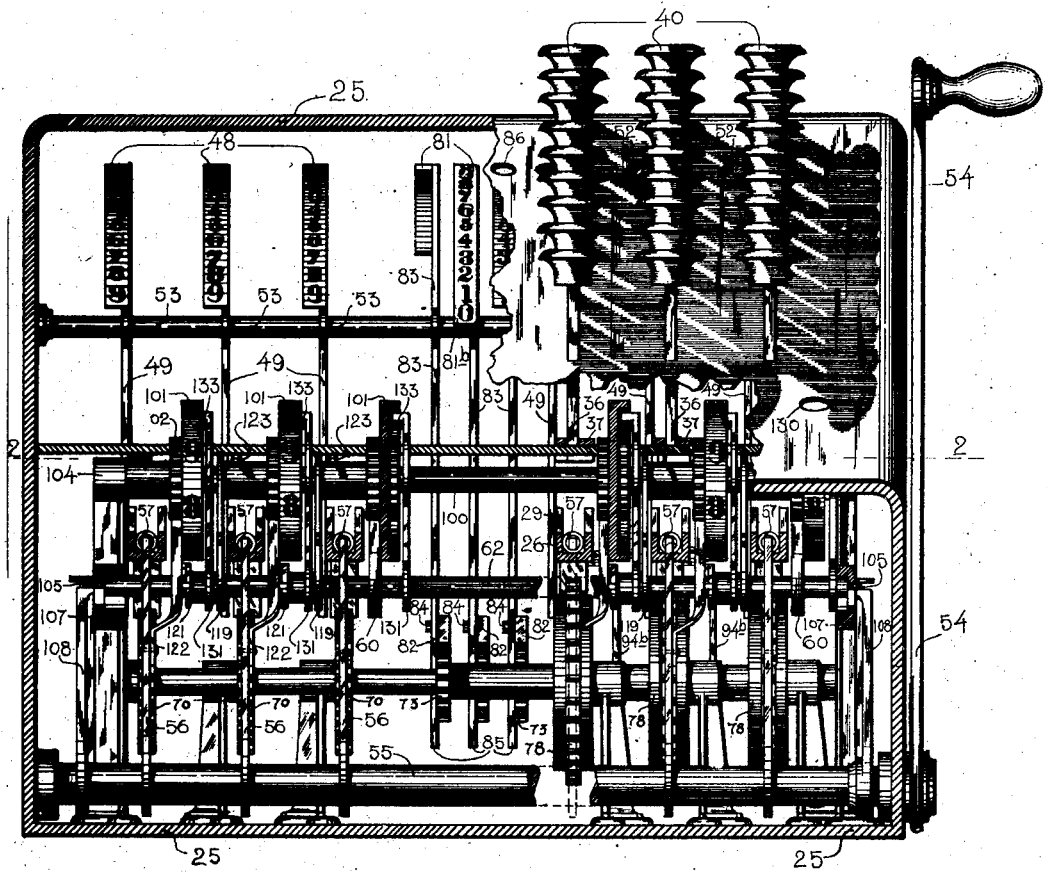
Figure 2:
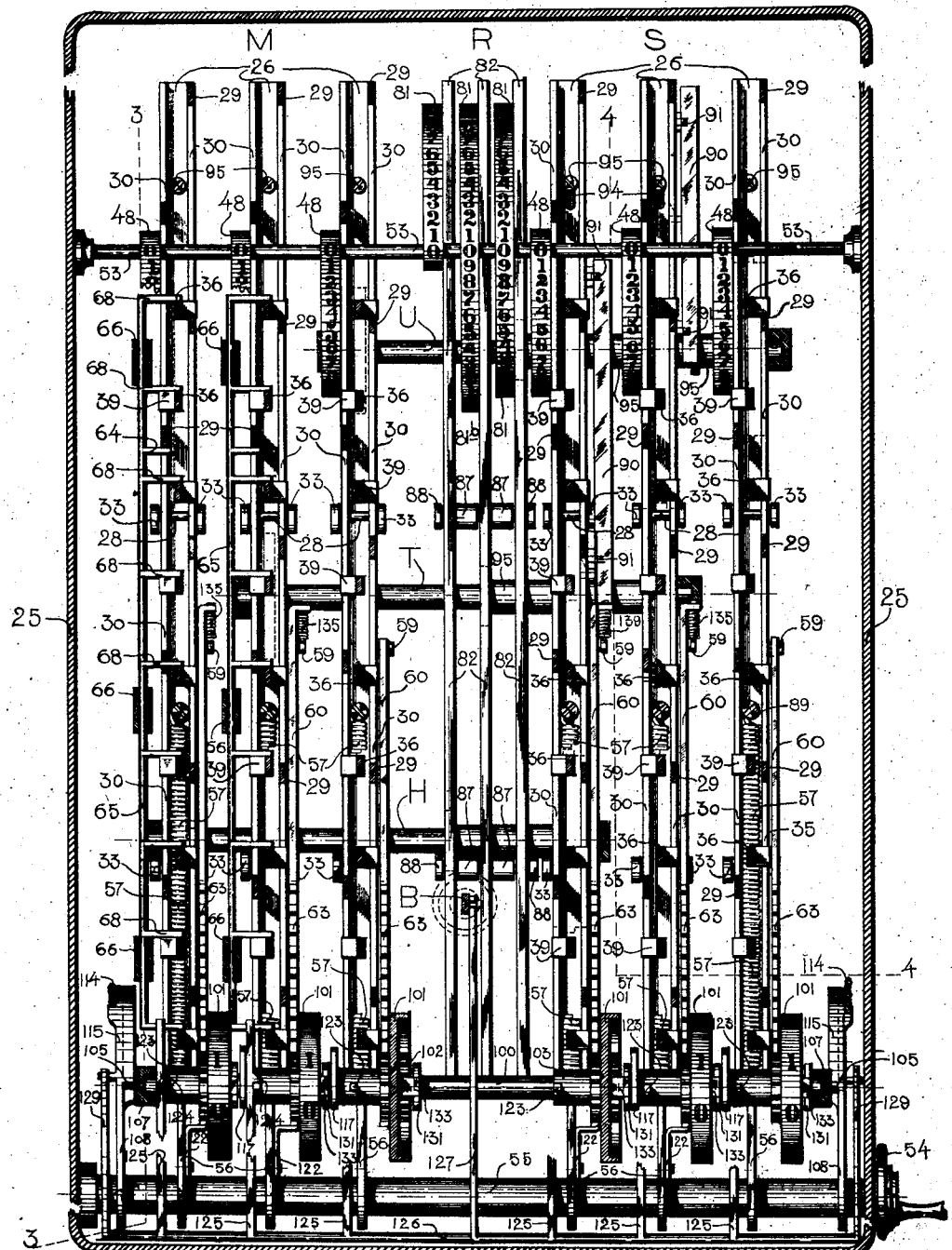
Figure 3:
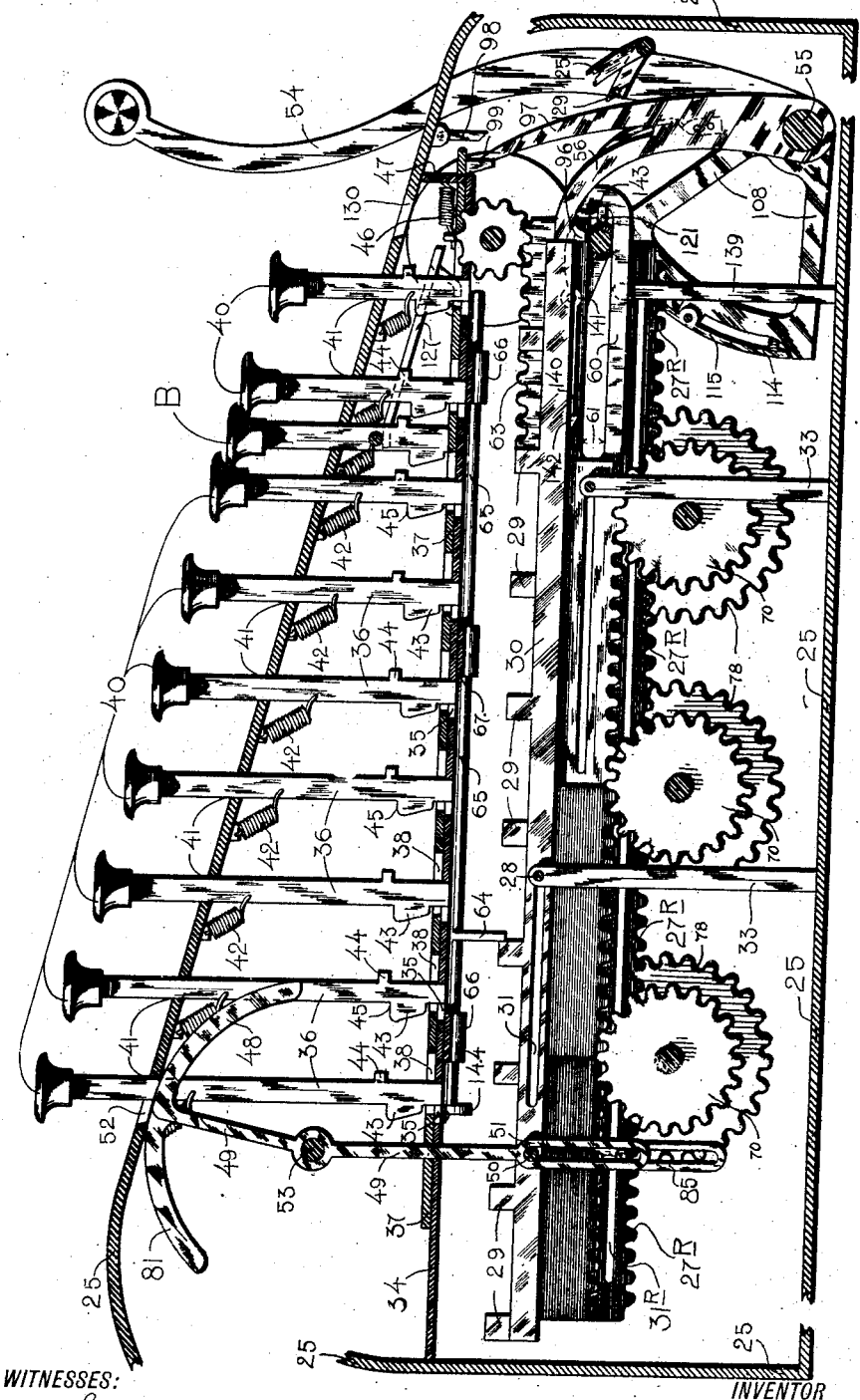
Figure 4:
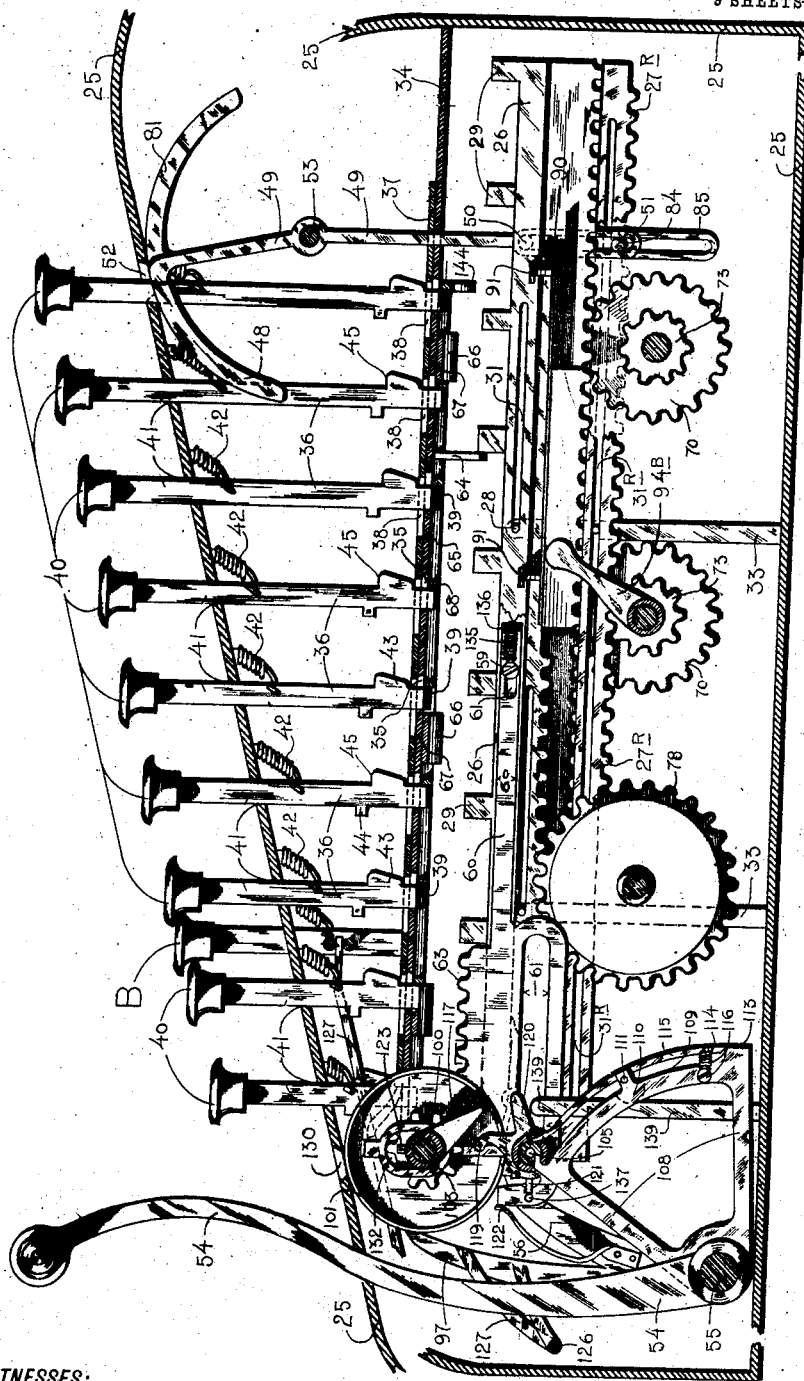
Figure 5:
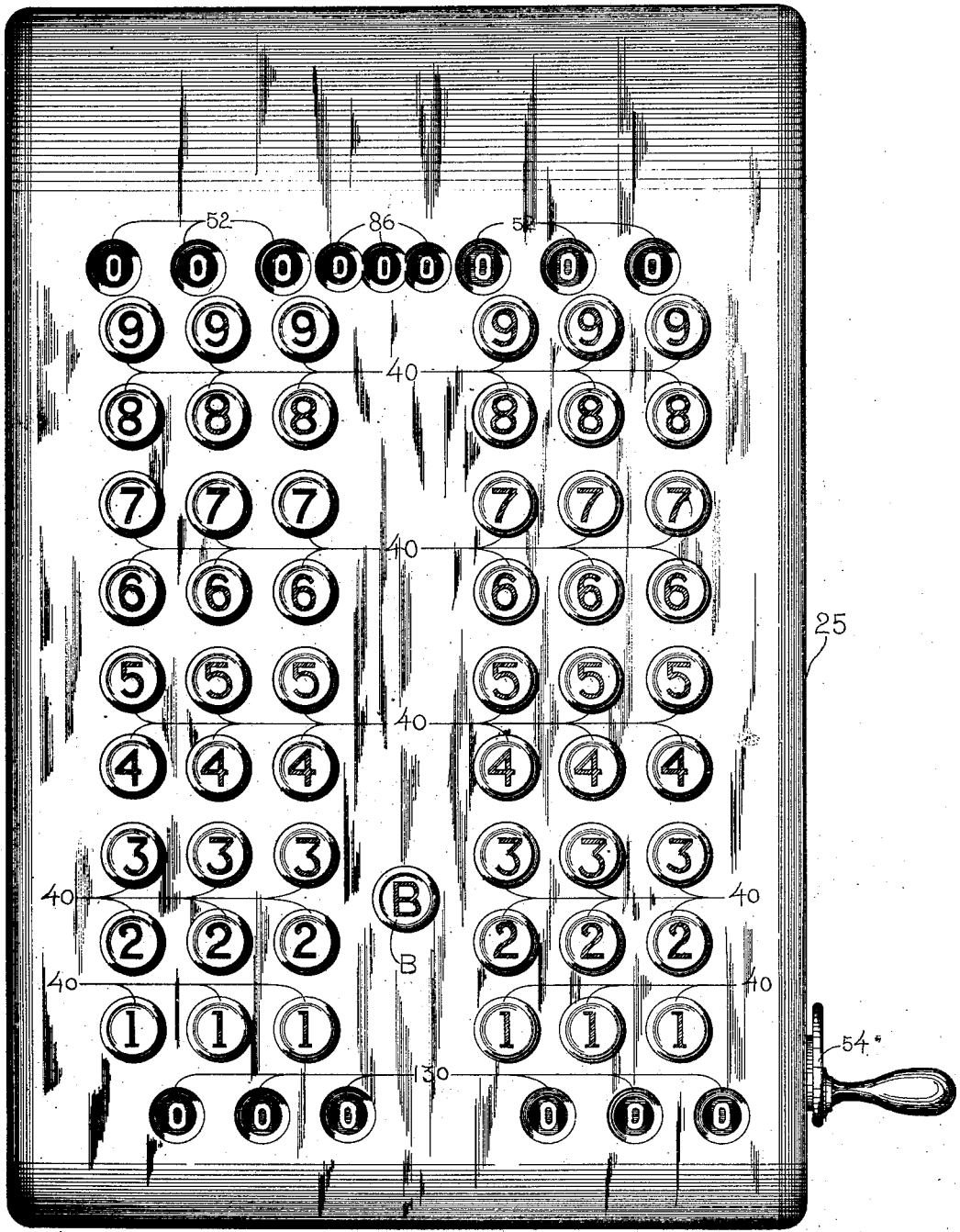

In the drawings Figure 1, is a front elevation of the device with the casing broken away, Fig. 2, is a sectional view taken on the line 2—2 of Fig. 1, Fig. 3, is a sectional view taken on the line 3—3 of Fig. 2, Fig. 4, is a sectional view taken on the line 4—4 of Fig. 2, Fig. 5, is a top view of the device, Fig. 6, is a disassembled view of the gears used to adjust the positions of the bars, Fig. 7, is an assembled view of the same, Fig. 8, is a broken-away plan view of a portion of the gearing showing the application of the bars thereto, Fig. 9, is a sectional view taken on the line $a$—$b$ of Fig. 8, Fig. 10, is a sectional view taken on the line $c$—$d$ of Fig. 8, Fig. 11, is a broken-away view of the gear shafting showing its connection with a finger and the application of the same to operate a plate in the practical use of the apparatus, Fig. 12, is a broken-away plan view of the bars showing their application to the gearing operating the totaling device, Fig. 13, is a sectional view taken on the line $a$—$b$ of Fig. 12, Fig. 14, is a sectional view taken on the line $c$—$d$ of Fig. 12, Fig. 15, is a sectional view taken on the line $e$—$f$ of Fig. 13, Fig. 16, is a sectional view taken on the line $g$—$h$ of Fig. 12, Fig. 17, is a plan view of the bars, showing their locking means, Fig. 18, is a sectional view taken on the line $a$—$b$ of Fig. 17, together with a section of the casing, and a broken-away view of the keys with a sectional view of the adjusting plates, Fig. 19, is a sectional view taken on the line $c$—$d$ of Fig. 17, together with a sectional view of the parts added in Fig. 18, Fig. 20, is an elevation of the crank shaft, showing also its connections with the other mechanism of the device, Figs. 21 and 22 are substantially end elevations of Fig. 20.

The apparatus is provided with a suitable casing 25.

The machine illustrated in the drawings provides for calculations reaching up to three figures only, although provision may be made for as many figures as desired. The primary mechanism is calculated for working problems in subtraction and inasmuch as it is desired to indicate the minuend, the subtrahend and the remainder in numerals in separate groups, I have provided a three-fold construction and indicating device, the minuend construction being indicated by M—Fig. 2, the subtrahend by S. Fig. 2 and the remainder by R Fig. 2.

A separate set of gearing and shafting is provided for each the minuend, subtrahend and remainder. Each set of gearing and shafting being alike and composed of the disassembled parts shown in Fig. 6 and when assembled being as shown in Fig. 7, the operation of which will be hereinafter explained. These sets are marked on Fig. 2 as follows: The set operating the units columns is marked U: the set operating the tens columns is marked T, and the set operating the hundreds columns is marked H. Bars 26 Fig. 2 in the shape of the letter U in cross-section, one for each column one each the minuend and subtrahend sides, extend longitudinally within the casing 25, and carry on their under surfaces racks (27 Figs. 3 and 4) adapted for engagement with gears to be hereinafter described. These bars 26 are provided with upwardly projecting pins 29, alternately arranged on the upwardly projecting portions 30 (Fig. 2) thereof. The bars 26 are required to be adjusted longitudinally and are therefore mounted on transversely arranged rollers 28 (Fig. 2) operating in oblong slots 31 (Figs. 3 and 4), the rollers 28 operating in bearings in the upright supports 33. A stationary plate 34 (Figs. 3 and 4) surmounts the bars 26 and is provided with openings 35 for the passage of the lower ends of the key stems 36. Slidably adjusted on top of the stationary plate 34 is a plate 37 provided with openings 38 for the passage of the lower ends of the key stems 36. The extreme lower ends 39 of the key stems 36 are bent at right angles with stems, every alternate one in each longitudinal row of keys being bent to the right and the other alternating ones bent to the left. Each row of keys (40 Figs. 5 and 17) is numbered from one to nine inclusive in regular order from the front end of the machine. The portions 39 of the key stems (36 Fig. 4) that are bent to the right are on the stems 36 having odd numbers on the keys 40 attached thereto and the portions 39 bent to the left are on the stems 36 having even numbers on the keys 40 attached thereto.

The key stems 36 pass through the openings 41 of the top of the casing 25 and are tied to the under side thereof by means of the coil springs (42 Fig. 4). The portions 39 on the key stems 36 are calculated to come in the path of the projecting pins 29 when the keys 40 are pressed downward bringing the lugs 43 through the openings 38 in the plate 37 with the stop pins 44 bearing against the upper side thereof, the top surface 45 of the lugs 43 bearing against the under side thereof (Fig. 4). The coil spring 46 attached to the slidably adjusted plate 37 and anchored to the frame of the machine as at 47 (Fig. 3) holds the said plate firmly against the back side of the key stems 36 over the lugs 43 locking the same in the depressed position until released as hereinafter explained. Underneath the top of the rear end of the casing 25 are disks 48 with figures longitudinally arranged on their upper surfaces, running from 0 to 9 inclusive, one each of such disks for the bars 26, to which bars the disks 48 are connected by means of the rigid rods 49 (Figs. 3 and 4). The rods 49 are connected to the bars 26 by means of the pins 50 operating in the links 51, the same being integral parts of the rods 49. Openings 52 in the top of the casing 25 make visible the numbers on the disks 48 directly beneath the same. The rods 49 are adapted to oscillate upon the shaft 53. A crank 54 is rigidly secured to a shaft 55 transversely arranged across the front end of the machine (Fig. 1). To this shaft 55 are rigidly secured rods 56, which in turn are connected to one end of coil springs 57 (Fig. 20), which in turn have their other ends connected to the U bars 26 as at 58 (Fig. 16).

To the sides of the bars 26 are pivoted as at 59 bars 60 provided with oblong slots 61 at their front ends (Figs. 3, 4 and 13) engaging the shaft 62 (Fig. 1). The top front ends of these bars 60 are provided with racks 63 (Fig. 2). The normal position of the disks 48 (Figs. 3 and 4) brings the 0 on them all directly underneath the openings 52 in the top of the casing 25 (Figs. 3, 4 and 5). The apparatus is held in this position by vertical projections 64 Fig. 3 reaching from the horizontal rods 65 Fig. 17, such rods 65 having bearings as at 66, secured by hinges 67 to the mechanism and also having horizontal projections 68 (Figs. 17 and 18) closely engaging the rear edges of the ends 39 of the key stems 36.

Gearings, as stated before, made in sets, one for each column provided in each the minuend, subtrahend and remainder, are made in two groups, an idler and a gear free from a shaft, gears 70 and 71 Fig. 6 rigidly secured to shaft 72, gears 73 and 74 rigidly secured to the tubular shaft 75, an idler gear 76 attached to the stud 77 and a large gear 78 free from a shaft and serving as a housing for gears 71, 74 and 76, the stud 77 carrying the gear 76 being secured to the inner wall as at 79 of one of the parts comprising the gear 78 which is composed of the parts 78$^a$ and 78$^b$ the same being hollowed out as at 80 to provide space for the gears 71, 74 and 76. The gear 71 is in mesh with gear 76 and gear 76 is in mesh with gear 74 Fig. 7.

Underneath the top of the rear end of the casing 25, at the center thereof, are disks 81 Fig. 1 with figures longitudinally arranged on their upper surfaces in rotation and including 0 to 9, one each of such disks for the bars 82, to which bars the disks 81 are connected by means of the rigid rods 83 Fig. 1. The rods 83 are connected to the bars 82 by means of the pins 84 operating in the links 85 (Figs. 1, 3 and 4), the same being integral parts of the rods 83. Openings 86 in the top of the casing 25 make visible the numbers on the disks 81 directly beneath the same. The rods 83 are adapted to oscillate upon the shaft 53 Fig. 1. The rods 82 carry racks 27 Fig. 3 (Figs. 3 and 4) on their under surfaces adapted to mesh with gears 73 Fig. 6. Rollers 87 mounted on uprights 88 Fig. 2 and operating in the oblong slots 31—R (Figs. 3 and 4) serve as guides for the longitudinal operation of the rods 82 Fig. 2 as hereinafter explained. As stated before, there is a set of gears, such as is indicated by Fig. 7 for each decimal in the problem to be solved, the gear 70 cooperating with a mechanism connected to the minuend indicator, the gear 78 coöperating with a mechanism connected to the subtrahend indicator and the gear 73 coöperating with a mechanism connected to the remainder indicator, each in mesh with the racks on their respective longitudinally arranged bars. In working a problem in subtraction where there is no greater number in the subtrahend than the number directly above it or in the same column, the respective keys on each the minuend and subtrahend sides are depressed bringing the same in locking engagement with the mechanism so that the portions 39 Fig. 2 are in the paths of the pins 29 Fig. 2, the locking pins 64 Fig. 4, are racked out of locking engagement with the pins 29 Fig. 4, by the contact of the lugs 43 Fig. 4 against the horizontal pins 68 Fig. 2, so that the bars 26 Fig. 2 corresponding with the columns of figures depressed on the keys are free to move. The crank 54 is drawn forward and the bars 26 Fig. 2 free to move are drawn forward by reason of their connection to the crank shaft 55 Fig. 2 by means of the rods 56 connected to the coil springs 57 Fig. 20 which in turn are connected to the rods 26 Fig. 2 as at 89 Fig. 2. The bars 26 Fig. 2 freed to move, as above stated, will be brought forward until they are stopped by the portions 39 Fig. 2 coming in contact with the pins 29 Fig. 2 which are so arranged and connected up with the disks 48 Fig. 2 that the figures on the same will be registered directly underneath the openings 52 in the top of the casing 25 Fig. 5.

With the moving forward of the bars 26 and racks 27, the gear mechanism shown in Figs. 6 and 7 rotates as follows. The gears 70 and 71 secured to the shaft 72 rotate forward with the bars 26 and racks 27 on the minuend side and the gears 78 rotate forward with the bars 26 and racks 27 on the subtrahend side, and so long as both these sets of gears rotate together no other gears rotate, excepting that the pinion gears 76 attached to the walls of the gears 78 rotate around the gears 74. When the forward movement of the bars 26 and the racks 27 on the subtrahend side are stopped by the parts 39 Fig. 2 of the depressed keys in the subtrahend side coming in contact with the rods 29 Fig. 2 on the bars 26, the gears 78 Fig. 7 stop rotating and the gears 70 Fig. 7 keep on rotating until the higher numbers in the minuend side are reached. Just to the extent that the minuend gears are rotated forward after the subtrahend gears are stopped, the remainder gears 73 Fig. 7 rotate backward, this backward movement being effected by the gears 71 Fig. 6 in mesh with the pinion gears 76 Fig. 6 rotating the pinion gears 76 forward and the pinion gears 76 being in mesh on the opposite side with the gears 74 Fig. 7 which rotate the gears 74 Fig. 7 backward and these gears being secured to the same tubular shafts 75 with the gears 73 Fig. 7 rotate the gears 73 Fig. 7 backward carrying the racks 27 R—Fig. 7, backward taking the bars 82 Fig. 2 with them. This backward movement has the effect of registering the remainder figures on the disks 81 Fig. 2 directly underneath the openings 86 Fig. 5 in the top of the casing 25—Fig. 5. Thus there exists underneath the openings on the top of the casing 25 Fig. 5 at the left the figures in the minuend columns, at the center the figures in the remainder columns and at the right the figures in the subtrahend columns. Inasmuch as it often happens that in the lower columns of the subtrahend figures are of a higher denomination than in the minuend columns directly in alinement with them provision is made for the borrowing or transferring process from the figure in the next higher column as follows: Attached to the sides of the bars 26 and horizontal therewith on the subtrahend side S Fig. 2 except as to the one corresponding with unit columns, are plates 90 Fig. 2, the same being secured by hinges 91 Fig. 9, lugs 92 Fig. 11 attached to the racks 27 Fig. 11 which are brought into engagement with projections 93 Fig. 11 on the plates 90. Attached to the tubular shafts 75 Fig. 11 (being the same shafts shown in Figs. 6 and 7) are fingers 94? Fig. 11 so adjusted thereto as to have the effect hereinafter stated.

The locking engagement of the lug 92 and projections 93 Fig. 11 is what holds the bars 26 in relative adjustment with their respective racks 27 Fig. 11. When the figure in the subtrahend is of a higher denomination than the one in the minuend directly above it, it will be seen that the subtrahend gear 78 Fig. 7 will be rotated farther than the gear 70 Fig. 7 on the corresponding minuend side. This of course rotates the rod 82 Fig. 7 forward to give the correct number on its relative disk 81 Fig. 2 under the openings 82 Fig. 2, to the full effect as if ten had been borrowed from the column ahead in the minuend the result being shown on the bend of the disks 81 Fig. 2, but it leaves the ten in the next column above in the remainder unless taken out. This ten is taken out in the following manner: The finger on the tubular shaft is rotated upwardly by the forward movement of the rack 27 R against the plate 90, tipping the same upwardly and releasing the lug 92 from the projection 93 on the rack of the next higher column of the subtrahend thereby breaking the longitudinal locking engagement of the bar 26 with its rack 27 Fig. 11. The bars 26 Fig. 2 have in their bottoms slots 94 Fig. 2, through which screws 95 Fig. 2 pass, the same engaging the body of the racks 27. Normally the screws 95 are at the back ends of the slots 94. The releasing of the locking engagement between the bar 26 and the rack 27 permits of the rack 27 rotating forward the distance of the length of the said slot which is equivalent to the distance between one figure and the next one to it on the disks 81 Fig. 2 of the remainder indicator. This rotates forward the gear 73 in the corresponding column of the remainder carrying with it the rack 27 R and bar 82, consequently rotating backward the corresponding disk 81 Fig. 2 one space thereby removing from the remainder the ten borrowed. The result of any problem being obtained and it being desired to return the mechanism to normal, the crank 54 is turned forward causing the rods 56 Fig. 3 and the shoulders 96 Fig. 3 to force the bars 26 and racks 27 back to normal, the rods 97 Fig. 3 to strike the suspended and pivoted pins 98 driving them against the plates 39 and then resting against the projections 99 thereon releasing the key bars 36 so that the springs 42 return them to the positions shown in Fig. 3, the enumerating disks and other parts taking their relative positions.

At the front end of the mechanism is a device which is so connected up with the general mechanism that columns of figures may be added on each the minuend and subtrahend sides thereof, totals ascertained, and then the same mechanism heretofore described used in subtracting the subtrahend from the minuend and registering the balance to the same effect as an original problem in subtraction. Either the minuend side or subtrahend side may be used for adding purposes alone, if desired. Transversely arranged across the front end of the machine is a shaft 100, having its bearings in the uprights 104. Wheels 101 Fig. 2 carrying a gear 102 on each side thereof are attached to separate sleeves 103 Fig. 14 engaging the shaft 100. The wheels 101 have provided on their peripheries numericals running from 0 to 9 inclusive, each numerical being an equal distance apart. The shaft 62 Fig. 2 has small pins 105 Fig. 2 at the ends thereof which have bearings in the vertical slots 106 Fig. 22 of the supports 107 Fig. 22. Attached to the shaft 55 are cams 108 Fig. 22 carrying recessed faces 109 Fig. 22. A post 110 Fig. 22 attached to the side thereof has pivoted thereto as at 111, webs 115 reaching from the projections 112 to the projections 113 Fig. 22, and coil springs 114 Fig. 22, connecting the webs 115 to the cams 108 as at 116 Fig. 22. Attached to the sleeves 103 Fig. 14 are fingers 117 Fig. 13. Sleeves 118 Fig. 14 free on the shaft 62 have radiating therefrom prongs 119 Fig. 13, lugs 120 Fig. 13 and projections 121 Fig. 13. Attached to the sides of the rods 56 Fig. 13 are springs 122 Fig. 13. Attached to the sleeve 103 Fig. 2 are pins 123 Fig. 2 directly in the path of catches 124 Fig. 2 of the rods 125 Fig. 2. The rods 125 Fig. 17 are secured to the cross rod 126 Fig. 17. The rods 125 Fig. 17 overlap the horizontal projections 68 Fig. 17. A central key B attached to the rod 127 Fig. 6 is rigidly secured to the cross rod 126. Curved arms 129 Fig. 22 are also rigidly secured to the cross rod 126 Fig. 22. The wheels 101 are normally arranged so that the 0 on the peripheries of each are directly underneath the openings 130 Fig. 5 of the lower end of the top of the casing 25.

Links 131 Fig. 14 loosely engaging the sleeves 118 Fig. 14 are provided with oblong slots 132 Fig. 13 which engage the shaft 100 Fig. 14 and are provided with horizontal projections 133 Fig. 14 adapted for engagement with the gears 102 Fig. 14. Oblong slots 134 Fig. 13 are provided in the bars 60 where the same are attached to the bars 26 Fig. 13 and a coil spring 135 Fig. 13 is placed between the binding screws 59 and projections 136 Fig. 13, the binding screws 59 normally engaging the slots 134 at the rear ends thereof. The small ends 105 Fig. 22 of the shaft 62 Fig. 20 are normally maintained at the top of the slots 106 Fig. 22 by the projections 112 of the cams 108 Fig. 22, but in the backward operation of the crank 54 in registering the result of a problem in subtraction the cam 108 is carried backward with the shaft 55 Fig. 22 and the ends 105 are permitted to drop downward in the slots 106 Fig. 22 and the curved surface 109 of the cam 108 Fig. 22 will follow underneath the same until the projection 113 Fig. 22 is reached. This movement of the crank 54 as aforesaid carries the parts 26, 29, 60, 61, 63, 56 and 122 Fig. 13 to the dotted lined positions marked with the letter $a$ added. It will be seen that the dropping of the shaft 62 throws the racks 63 out of mesh with the gears 102 Fig. 14 and the positions of the wheels 101 are not disturbed, but in the return movement of the crank 54 Fig. 22 the ends 105 of the shaft 62 having been carried up the inclines of the projections 113 Fig. 22, now take a position on the tops of the webs 115 Fig. 22 which return the ends 105 to the top of the slots 106 Fig. 22. The shaft 62 is again raised and the racks 63 thrown in mesh with the gears 102 Fig. 14 and the wheels 101 Fig. 14 are rotated the same number of spaces as the bars 26 attached thereto registered out. The wheels 101 Fig. 14 register through the openings 130 Fig. 5 of the top of the casing the same numbers as were registered through the openings 52 Fig. 5 on the minuend and subtrahend sides when the result of the problem in subtraction was shown.

In as much as there is no reverse motion of the wheels 101 Fig. 14 in the backward movement of the crank 54, each the minuend and subtrahend sides may be continually totaled so long as is desired, which may be done for totaling purposes in problems in subtraction or the process may be carried on for the purposes of addition only, in either the minuend or the subtrahend sides or both. There are ten sprockets to each of the gears 102 Fig. 13, the same number as there are numbers on the peripheries of the wheels 101 Fig. 13. In the process of adding the carrying from one column up to a higher is accomplished in the following manner: The wheels 101 normally registering 0 the fingers 117 are just past the prong 119. When more than 9 is registered on the wheel 101 in the unit column or any other column the finger 117 attached to the sleeve 103 strikes the prong 119 Fig. 13 rotating the same forward a sufficient distance to permit of the finger 117 passing. This releases the projection 121 from the pin 137 Fig. 13 permitting the strong spring 122 to crowd the rack 63 corresponding to the next higher column of figures backward the length of the slot 134 Fig. 13 which is the distance of one figure on the periphery of the corresponding wheel 101 Fig. 14, whereby the one is added to the next column above. This process by the same successive mechanism can be carried up from one column to another. When the central key B Fig. 22 is pressed downward, the rods 125 and 127, and the curved arms 129 Fig. 22 assume the positions marked with the letter $a$ added. The locking pins 64 Fig. 18 are thus rocked out of engagement with the pins 29 leaving the bars 26 free to move the end of the webs 116 Fig. 22 as the projection 121 has been forced downward against the projection 112 by the end 138 Fig. 22 of the curved arm 129, so that when the crank 54 is drawn backward the ends 105 ride on the upper surface of the webs 115 instead of on the surface 109 of the cam 108 Fig. 22 thereby holding the racks 63 in mesh with the gears 102 and the wheels 101 Fig. 14 are rotated in an opposite direction until the pins 123 Fig. 2 are blocked by the lugs 124 Fig. 2 on the rods 125 Fig. 2 which will be when the wheels 101 Fig. 2 have reached the point indicating zero. The connections between the racks 63 and the bars 26 Fig. 2 together with the connection of the disks 48 and 81 transfers the figures from the totaling end of the machine to the subtrahend end and the minuend, subtrahend and remainder are there indicated. When the shaft 62 Fig. 13 is at its highest position the projections 133 are out of engagement with the gears 102, but when the shaft is at its lowest position the engagement takes place and prevents any accidental change of position of the wheels 101. When the shaft 62 drops to its lowest position at any time after a number has been carried from a lower to a higher column in addition by the method heretofore described, the projection 120 Fig. 13 strikes the end of the upright 139 Fig. 13 and drives the same from the dotted position 129$^a$ to normal as well as driving the other parts 119 and 121 to normal as shown in Fig. 13.

In the process of addition as above described where it is necessary to carry to the column above and utilize the slot 134 Fig. 13 in changing the relative positions of the bars 26 and 60 Fig. 13, it becomes necessary to release a locking means composed of a lever 140 Fig. 3 fulcrumed at 141 Fig. 3 with one end bearing against the lug 142 Fig. 3 on the bar 26 Fig. 3 and the other end 143 Fig. 3 bearing against the projection 121 Fig. 3. When the prong 119 Fig. 13 is driven forward by the finger 117 Fig. 13, the projection 121 Fig. 13 forces the end 143 Fig. 3 upward which carries the other end of the lever 140 Fig. 3 downward, releasing the same from engagement with the lug 142 Fig. 3, thereby permitting of the relative change in positions of the bars 26 and 60 Fig. 13.

The springs 144 Fig. 19 return the parts 64 and 68 Fig. 19 to the positions shown in Fig. 17 when free so to do.

Having thus described my invention what I claim as new and useful and desire to secure by Letters-Patent, is,

1. In a calculating machine, the combination of a plurality of pairs of bars, paralleling each other across the machine and having racks attached thereto mounted on gears, the gears adapted to rotate independently of each other, the said bars adapted for longitudinal movement along with the racks over said gears, the length of such movements being gaged by locking means effected by stops on the key bars engaging stops on the paralleling bars, a third system of bars paralleling the said sets of bars across the machine carrying racks mounted on gears, one side of said first mentioned bars together with its accompanying gears representing the minuend in a problem in subtraction, the other side thereof together with its accompanying gears representing the subtrahend and the third system of bars together with its accompanying gears representing the remainder, each of such bars being so connected up with disks having curved peripheral extensions divided into numbered registering spaces, that such disks will register before a face plate on the machine the minuend, subtrahend and remainder respectively when the bars are operated to meet the locking means with the respective numbers on the keys.

2. In a calculating machine, the combination of a plurality of pairs of bars, paralleling each other across the machine and having racks attached thereto mounted on gears, the gears adapted to rotate independently of each other, the said bars adapted for longitudinal movement along with the racks over said gears, the length of such movements being gaged by locking means effected by stops in the key bars engaging stops on the paralleling bars, a third system of bars paralleling the said sets of bars across the machine carrying racks mounted on gears, and means for changing the relative longitudinal positions of each bar with its corresponding rack.

3. In a calculating machine, the combination of a plurality of pairs of bars, paralleling each other across the machine and having racks attached thereto mounted on gears, the gears adapted to rotate independently of each other, the said bars adapted for longitudinal movement along with the racks over said gears, the length of such movements being gaged by locking means effected by stops in the key bars engaging stops on the paralleling bars, a third system of bars paralleling the said sets of bars across the machine carrying racks mounted on gears, and means for changing the relative longitudinal positions of each bar with its corresponding rack together with means for retaining said bars in relative neutral positions to register o in each the minuend, subtrahend and remainder systems on the numbered spaces of the registering disks, means for releasing the same and means for changing the relative longitudinal positions of each of the bars, and means for returning all bars to relative neutral positions.

4. In a calculating machine, the combination of a plurality of pairs of bars, paralleling each other across the machine and having racks attached thereto mounted on gears, the gears adapted to rotate independently of each other, the said bars adapted for longitudinal movement along with the racks over said gears, the length of such movements being gaged by locking means effected by stops on the key bars engaging stops on the paralleling bars, a third system of bars paralleling the said sets of bars across the machine carrying racks mounted on gears, one side of said first mentioned bars together with its accompanying gears representing the minuend in a problem in subtraction, the other side thereof together with its accompanying gears representing the subtrahend and the third system of bars together with its accompanying gears representing the remainder, each of such bars being so connected up with disks having curved peripheral extensions divided into numbered registering spaces, that such disks will register before a face plate on the machine the minuend, subtrahend and remainder respectively when the bars are operated to meet the locking means with the respective numbers on the keys, together with a shaft mounted transversely of the machine carrying wheels having peripheries divided into numbered registering spaces, such wheels carrying gears meshing with racks attached to the first above mentioned sets of bars in such a manner that with the movements of the bars in registering the minuend and subtrahend such wheels register before openings in the top of the casing, duplicates of the minuend and subtrahend of the first problem in subtraction worked in a given series and adds to the same the amount of each succeeding minuend and subtrahend and registers the same as aforesaid.

5. In a calculating machine, the combination of a plurality of pairs of bars, paralleling each other across the machine and having racks attached thereto mounted on gears, together with a third system of bars, paralleling the said sets of bars across the machine, carrying racks mounted on gears, one side of said sets of gears representing the minuend side of the machine mechanism and coöperating therewith, the other side thereof representing the subtrahend side thereof and coöperating therewith and the third set representing the remainder mechanism thereof and coöperating therewith, all of the gears so connected that the minuend and subtrahend gears may rotate together in the same direction while the remainder gears stand still, and when the subtrahend gear ceases to rotate and the minuend gears continue to rotate, that the remainder gears will rotate in an opposite direction to the full extent that the minuend gears rotate after the subtrahend gears cease to rotate.

In testimony whereof I affix my signature in presence of two witnesses.

JOHN OTTO ALMEN.

Witnesses:
H. O. ALMEN,
WILLIAM H. KAYE.

---

Copies of this patent may be obtained for five cents each, by addressing the "Commissioner of Patents, Washington, D. C."